United States Patent
Chen

(10) Patent No.: US 10,922,531 B2
(45) Date of Patent: Feb. 16, 2021

(54) FACE RECOGNITION METHOD

(71) Applicant: PEGATRON CORPORATION, Taipei (TW)

(72) Inventor: Po-Sen Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 234 days.

(21) Appl. No.: 16/247,641

(22) Filed: Jan. 15, 2019

(65) Prior Publication Data

US 2019/0311186 A1 Oct. 10, 2019

(30) Foreign Application Priority Data

Apr. 9, 2018 (TW) .............................. 107112188 A

(51) Int. Cl.
| | | |
|---|---|---|
| *G06K 9/00* | (2006.01) | |
| *G06K 9/32* | (2006.01) | |
| *G06N 5/04* | (2006.01) | |
| *G06N 3/08* | (2006.01) | |
| *G06N 3/04* | (2006.01) | |
| *G06K 9/62* | (2006.01) | |

(52) U.S. Cl.
CPC ....... *G06K 9/00295* (2013.01); *G06K 9/3241* (2013.01); *G06K 9/6202* (2013.01); *G06N 3/0454* (2013.01); *G06N 3/08* (2013.01); *G06N 5/046* (2013.01)

(58) Field of Classification Search
CPC .......................... G06K 9/00295; G06K 9/3241
See application file for complete search history.

(56) References Cited

U.S. PATENT DOCUMENTS

| | | | | |
|---|---|---|---|---|
| 2008/0044064 | A1 | 2/2008 | His | |
| 2012/0293705 | A1* | 11/2012 | Su | ........................ H04N 5/2621 348/345 |
| 2016/0093023 | A1 | 3/2016 | Prasad et al. | |
| 2017/0364635 | A1* | 12/2017 | Kobayashi | ............. G16H 30/40 |

FOREIGN PATENT DOCUMENTS

| | | |
|---|---|---|
| CN | 1866270 A | 11/2006 |
| CN | 107004115 A | 8/2017 |
| CN | 107886064 A | 4/2018 |
| TW | 201249191 A1 | 12/2012 |
| WO | 2016/086330 A1 | 6/2016 |

OTHER PUBLICATIONS

Office Action issued in corresponding Taiwan patent application dated Feb. 26, 2019.

* cited by examiner

*Primary Examiner* — Tuan H Nguyen
(74) *Attorney, Agent, or Firm* — McClure, Qualey & Rodack, LLP

(57) ABSTRACT

A face recognition method is disclosed. First, an input image is received. After the input image is received, face recognition is performed on the input image by using a first CNN model to generate at least one first ROI, where each first ROI includes a suspicious image, and a proportion value of a pixel value of the suspicious image in a pixel value of the first ROI is greater than a proportion value of the pixel value of the suspicious image in a pixel value of the input image. Then, face recognition is performed on each first ROI by using a second CNN model to generate at least one second ROI, where the quantity of convolution operation layers of the second CNN model is less than the quantity of convolution operation layers of the first CNN model. Finally, a mark is displayed in the input image.

14 Claims, 4 Drawing Sheets

FACE RECOGNITION METHOD

CROSS-REFERENCE TO RELATED APPLICATION

This non-provisional application claims priority under 35 U.S.C. § 119(a) to Patent Application No. 107112188 filed in Taiwan, R.O.C. on Apr. 9, 2018, the entire contents of which are hereby incorporated by reference.

BACKGROUND

Technical Field

Embodiments of the application relate to image recognition, and in particular, to a face recognition method.

Related Art

Generally, face recognition methods are mainly classified into a global feature method and a local feature method. In the global feature method, a whole face is directly used as one feature for recognition. In the local feature method, local features on a face, such as eyes, a nose, and a mouth, are gradually found out, then the local features are respectively used for recognition, and finally, results of the local features are combined to obtain a recognition result.

Statistics show that compared with the global feature recognition method, the local feature recognition method has higher accuracy. However, the accuracy of recognizing a face will be obviously affected in different backgrounds, in different light, at different angles, and in different expression changes. In addition, it is difficult for the foregoing face recognition method to achieve a real-time detection effect.

SUMMARY

This application discloses a face recognition method, including receiving an input image. After the input image is received, face recognition is performed on the input image by using a first convolutional neural network (CNN) model to generate at least one first region of interest (ROI), where each first ROI includes a suspicious image, and a proportion value of a pixel value of the suspicious image in a pixel value of the first ROI is greater than a proportion value of the pixel value of the suspicious image in a pixel value of the input image. Then, face recognition is performed on each first ROI by using a second CNN model to generate at least one second ROI, where the quantity of convolution operation layers of the second CNN model is less than the quantity of convolution operation layers of the first CNN model. Finally, a mark corresponding to the position of the second ROI is displayed in the input image.

DETAIL DESCRIPTION OF THE EMBODIMENTS

Figure 1:
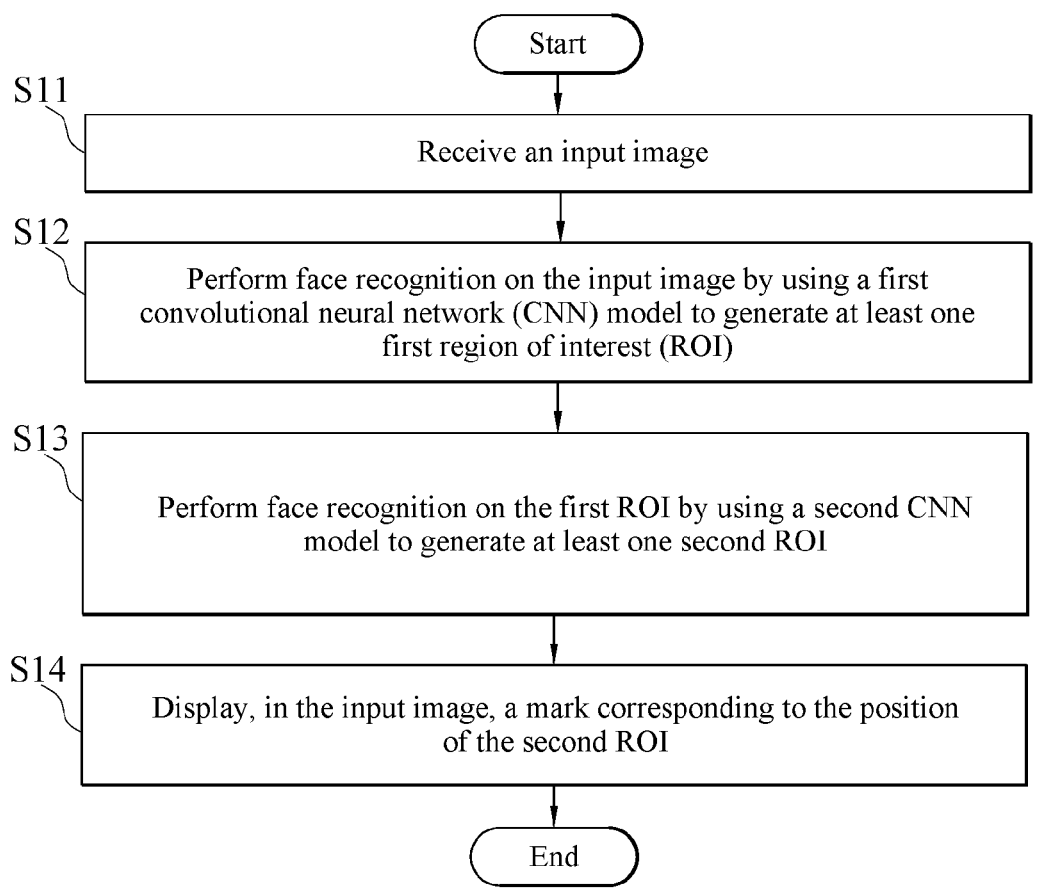
FIG. 1 is a step flowchart of an embodiment of a face recognition method according to the application.

Referring to FIG. 1, FIG. 1 is a step flowchart of an embodiment of a face recognition method according to the application. Architecture of a multilayer convolutional neural network (CNN) model is mainly used, and two-stage image recognition is performed on an input image including a face image, by using at least two CNN models that are differently trained in advance. Different CNN models have different operation layer quantities. Each CNN model can extract and classify features, and use an output of a previous layer as an input of a next layer.

In an embodiment of the face recognition method according to the application, two stages are included, and after first-stage image recognition is performed, a first ROI R1 is output. At the second stage, recognition is performed on the first ROI R1 to output a second ROI R2 including a face image. In this way, a processing time of all CNN models is reduced, thereby improving the image recognition efficiency.

Referring to FIG. 1, in an embodiment of a face recognition method shown in FIG. 1, a face image in an input image is recognized. First, an input image I is received (step S11).

Figure 2:
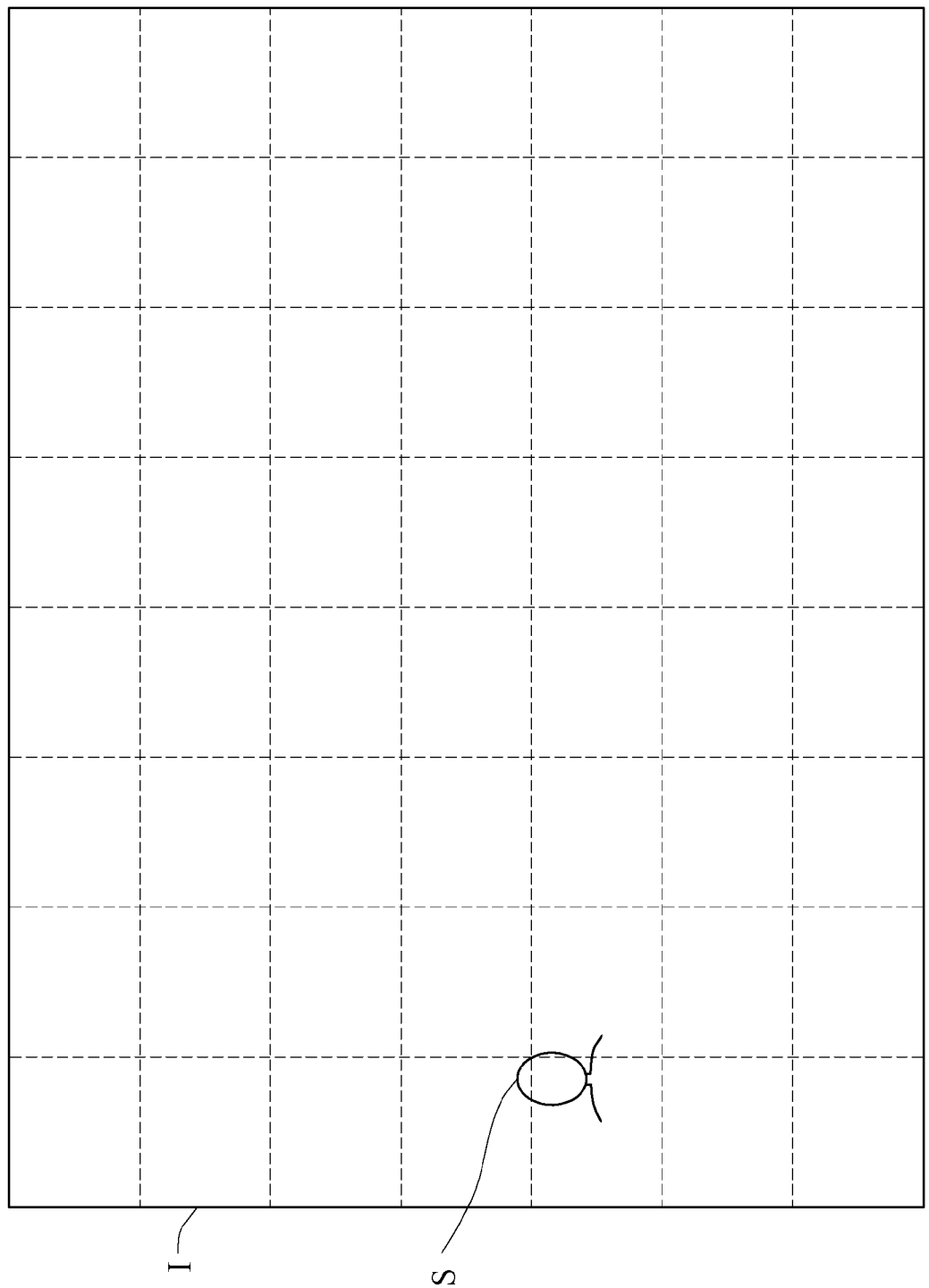
FIG. 2 is a schematic diagram of an embodiment of an input image in a face recognition method according to the application.

In this case, referring to FIG. 2, the input image I may be a frame in a picture, a photo, or a film or an image captured by an image capturing device (for example, a camera).

Still referring to FIG. 1, after the input image I is received (step S11), first-stage recognition is performed by using a first CNN model to generate an ROI. The ROI is a particular to-be-detected region that is used to mark a search range of a traced object in image recognition, and that is obtained after regions of low relevancy and noise are removed.

Figure 3:
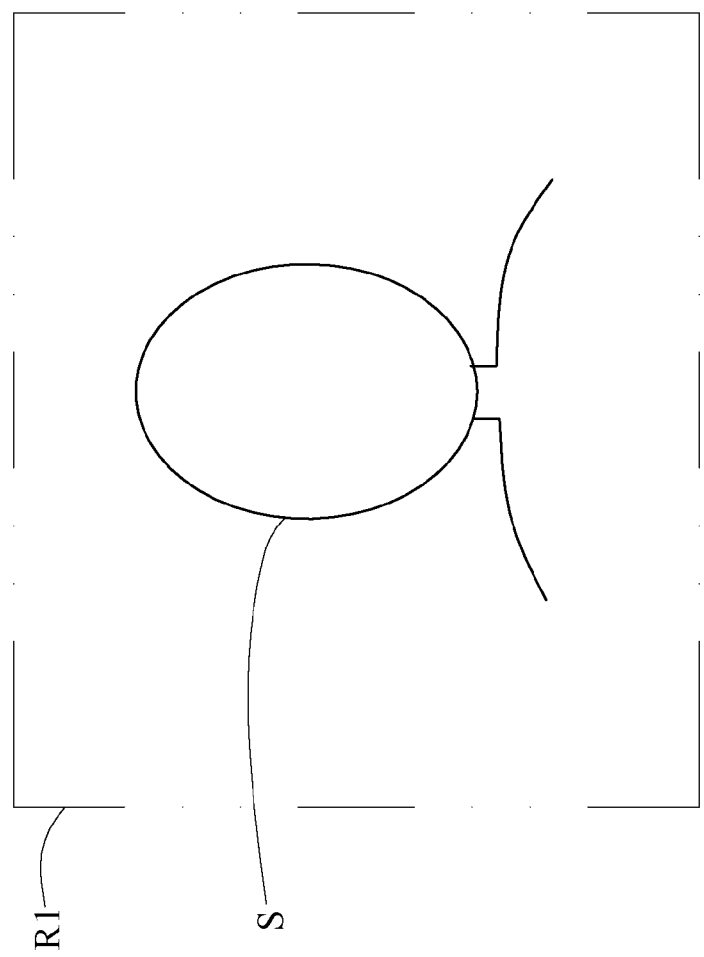
FIG. 3 is a schematic diagram of an embodiment of a first ROI in a face recognition method according to the application.

Specifically, referring to FIG. 1 to FIG. 3, in this embodiment, face recognition is performed on the input image by using the first CNN model to generate at least one first ROI R1 (step S12). In this step, each first ROI R1 includes a suspicious image S, and a proportion value of a pixel value of the suspicious image S in a pixel value of the first ROI R1 is greater than a proportion value of the pixel value of the suspicious image S in a pixel value of the input image I.

Further, referring to FIG. 3, the suspicious image S in the first ROI R1 is suspected to be a face image. Therefore, specifically, the first ROI R1 generated after face recognition is performed by using the first CNN model may be an image including a face or may be an image not including a face. In this way, the suspicious image S that may include a face image is rapidly selected first. Specifically, in this embodiment, after tests, the accuracy that the first ROI R1 generated after face recognition is performed by using the first CNN model has a face image is as high as 85.6%.

Then, also referring to FIG. 1, after the first ROI R1 is generated, face recognition is then performed on each first ROI R1 by using the second CNN model to generate at least one second ROI R2 (step S13), where the quantity of convolution operation layers of the second CNN model is less than the quantity of convolution operation layers of the first CNN model.

In this embodiment, all first ROIs R1 generated by using the first CNN model are input to the second CNN model for recognition. Because the second CNN model is used to perform recognition on the first ROI R1 including the suspicious image S, and the suspicious image S in the first ROI R1 is extracted from the input image I, a proportion of the suspicious image S in the first ROI R1 is greater than that of the suspicious image S in the input image I. In this way, the second CNN model can more rapidly recognize whether the suspicious image S in the first ROI R1 includes a face, and generate, based on this, the second ROI R2 that actually includes a face. Specifically, in this embodiment, after tests, the accuracy that the second ROI R2 generated after recognition is performed by using the second CNN model has a face image can be further increased to 89.2%.

Figure 4:
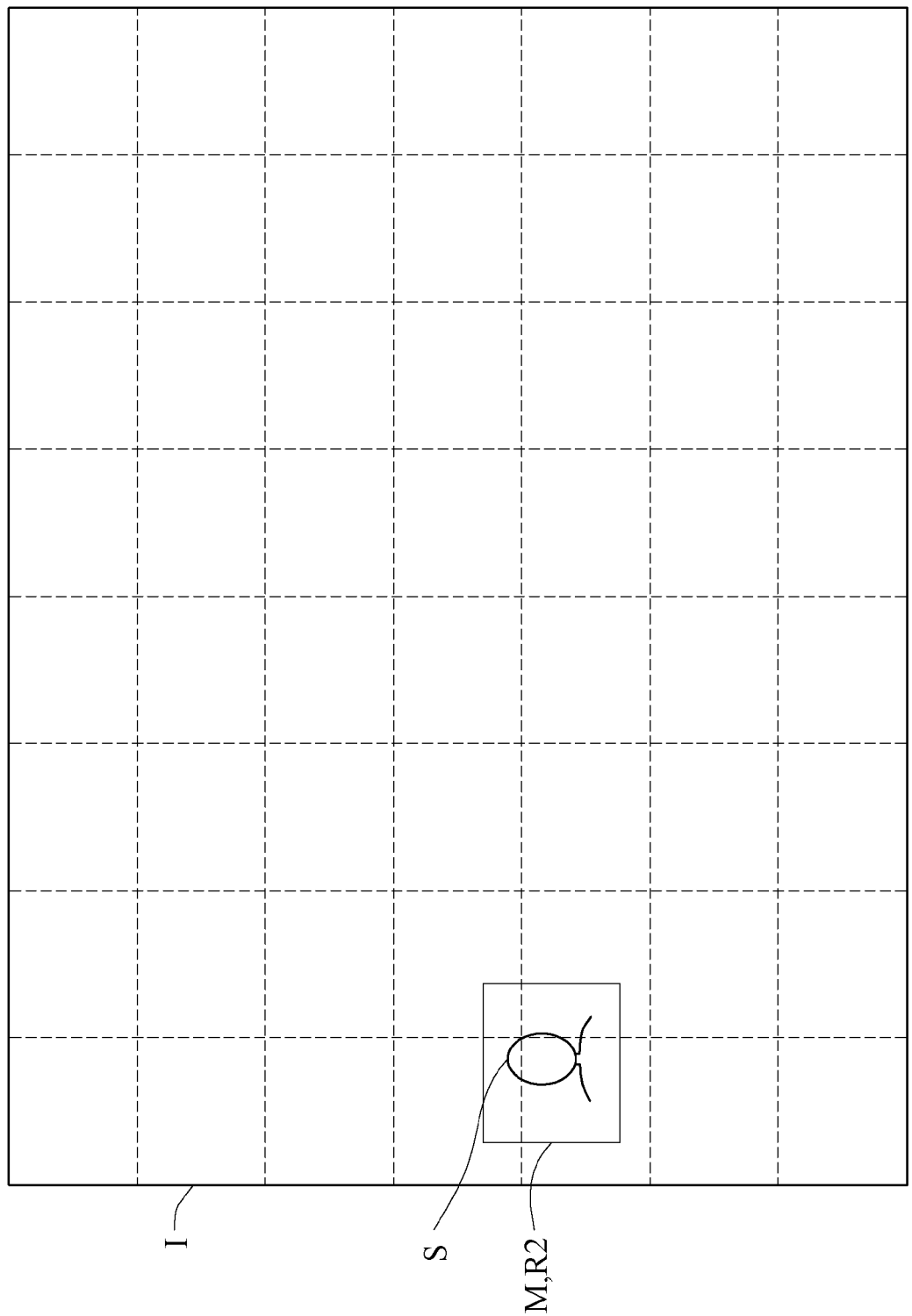
FIG. 4 is a schematic diagram of an embodiment of displaying a mark in an input image in a face recognition method according to the application.

Finally, referring to FIG. 1 and FIG. 4 in combination, a mark M corresponding to the position of the second ROI R2 is displayed on the input image I. It should be noted that, the first ROI R1 generated by using the foregoing first CNN model and the second ROI R2 generated by using the foregoing second CNN model are parameter values in an operation process instead of a physical image displayed on the input image I. That is, the first ROI R1 and the second ROI R2 are coordinate range values of local regions in the input image I.

Therefore, in this step, after face recognition is performed by using the second CNN model and the second ROI R2 is generated, the mark M is overlaid and displayed in the position of the second ROI R2. That is, in this step, the position of a parameter value generated after a corresponding operation is performed can be displayed by using the mark M. In this case, the mark M that marks the second ROI R2 may be in a form of a square, a circle, or another eye-catching mark. Based on this, the face image can be rapidly and accurately extracted and marked in the application.

Further, the first CNN model and the second CNN model are CNN models established after training is performed by using different training materials. Specifically, in an embodiment, the first CNN model is established after training is performed by using a first image material.

In an embodiment, the second CNN model is established after training is performed by using a second image material. Both the first image material and the second image material are image materials including a face image. In this case, the first image material includes a first face image, and the second image material includes a second face image.

Further, the more the first image material and the second image material are used in training before the first CNN model and the second CNN model are established, the better the training effect can be achieved. In addition, the more diversified the conditions of the first face image and the second face image in the first image material and the second image material are, the better the training effect can be achieved. Different conditions of the first face image and the second face image are that, for example, a face or different faces are captured in different shadows, at different angles, in different backgrounds, in different light brightness degrees, in different expression changes, or in different shielding degrees.

Further, the first image material has a first pixel value, the first face image has a first to-be-detected pixel value, and a proportion value of the first to-be-detected pixel value in the first pixel value is a first to-be-detected image proportion value. The second image material has a second pixel value, the second face image has a second to-be-detected pixel value, and a proportion value of the second to-be-detected pixel value in the second pixel value is a second to-be-detected image proportion value. In this case, the first to-be-detected image proportion value is different from the second to-be-detected image proportion value.

In an embodiment, the first to-be-detected image proportion value is less than the second to-be-detected image proportion value. Specifically, a pixel value proportion of the first face image in the first image material is equivalent to a pixel value proportion of the first ROI R1 in the input image I shown in FIG. 2. A pixel value proportion of the second face image in the second image material is equivalent to a pixel value proportion of the second ROI R2 in the first ROI R1 shown in FIG. 3.

More specifically, the first to-be-detected image proportion value is greater than or equal to 0.1%, and the second to-be-detected image proportion value is greater than or equal to 50%. That is, specifically, a proportion of a face in the first image material when training is performed by using the first image material before the first CNN model is established may be extremely small, and certainly, a face that has a relatively large face proportion in the first image material is not excluded. That is, the first image material may be an image that has a large shooting range and a deep depth of field, and may include a face as highly as possible. In this way, the first CNN model can recognize a relatively small face in the input image.

It should be further noted that, because the first to-be-detected image proportion value is related to the first ROI that is generated after the first CNN model recognizes an image, in an implementation aspect in which the first to-be-detected image proportion value is greater than or equal to 0.1%, the operation burden can be lightened, thereby increasing the operation speed of the first CNN model and the accuracy of image recognition.

The second image material by using which training is performed before the second CNN model is established is an image in which a face occupies more than 50% of the second image material. In this way, the second CNN model can recognize a face that occupies at least half an image, in images input to the second CNN model, and exclude an image that does not include a face.

Further, the first CNN model includes a plurality of first convolution operation layers, and the second CNN model includes a plurality of second convolution operation layers. Specifically, in an embodiment, the first convolution operation layer and the second convolution operation layer may further include a feature extraction layer and a feature mapping layer respectively. Inputs of neurons at the feature extraction layer are connected to a local receptive field at a previous layer, to extract related local features. The feature mapping layer is generated by mapping a plurality of features, each mapping is a plane, and weights of neurons at a same feature mapping plane are the same. The first CNN model and the second CNN model respectively recognize a face through feature extraction and mapping by using the plurality of first convolution operation layers and the plurality of second convolution operation layers.

In this embodiment, the quantity of convolution operation layers of the second CNN model is less than the quantity of convolution operation layers of the first CNN model. Specifically, in this embodiment, compared with a conventional CNN model, an operation parameter quantity of the first convolution operation layers of the first CNN model can be reduced by 10% approximately. An operation parameter quantity of the second convolution operation layers of the second CNN model is approximately 20% of the operation parameter quantity of the first convolution operation layers. In this way, the operation parameter quantities of the first CNN model and the second CNN model are significantly reduced, thereby improving the operation efficiency.

Specifically, the first CNN model in this embodiment specifically performs a detection operation on a 1080 P (1980×1080 pixel size) image. An execution speed can reach 100 FPS (Frame per Second), and first ROIs R1 having a size of at least 20×20 pixels can be detected.

Specifically, in a detection operation performed on the first ROIs R1, the second CNN model can achieve a higher execution speed than that achieved by the first CNN model. During specific implementation of this embodiment, the second CNN model can achieve an execution speed of 500 FPS, and can recognize an image in which the first ROI occupies 50% of the image and output a second ROI R2.

In this case, an output of the first CNN model is an input of the second CNN model. In addition, an output of each first convolution operation layer of the first CNN model can also be used as an input of another subsequent first convolution operation layer. Similarly, an output of each second convolution operation layer of the second CNN model can also be used as an input of another subsequent second convolution operation layer. In this way, even if the operation parameter quantity of the first CNN model is reduced, because all the first ROIs R1 generated by the first CNN model are input again into the second CNN model for a convolution operation, a face image can be extracted assuredly, and the time used for the convolution operation is reduced.

Further, in an embodiment, the first CNN model may further include a first pooling operation layer for a pooling operation. The pooling operation performed at the first pooling operation layer may be maximum pooling or average pooling. By means of a configuration of the first pooling operation layer, a parameter quantity is reduced, so that an operation speed achieved after the pooling operation is performed at the first pooling operation layer is increased. In this case, the quantity of first pooling operation layers is not limited, and the first pooling operation layer may be disposed between two first convolution operation layers or disposed after another first pooling operation layer. In this case, similarly, regardless of whether the first pooling operation layer is disposed between two first convolution operation layers or disposed after another first pooling operation layer, an output of each layer can be used as an input of another layer or a subsequent layer. In this way, the pooling operation process is repeated to dramatically reduce the operation parameter quantity.

Further, in an embodiment, the second CNN model may further include a second pooling operation layer for a pooling operation. The pooling operation performed at the second pooling operation layer may be maximum pooling or average pooling. By means of a configuration of the second pooling operation layer, a parameter quantity is reduced, so that an operation speed achieved after the pooling operation is performed at the second pooling operation layer is increased. In this case, the quantity of second pooling operation layers is not limited, and the second pooling operation layer may be disposed between two second convolution operation layers or disposed after another second pooling operation layer. In this case, similarly, regardless of whether the second pooling operation layer is disposed between two second convolution operation layers or disposed after another second pooling operation layer, an output of each layer can be used as an input of another layer or a subsequent layer. In this way, the pooling operation process is repeated to dramatically reduce the operation parameter quantity.

The method disclosed in the application may exist in a form of program code. The program code may be included in a physical medium, for example, a floppy disk, an optical disc, a hard disk, or any other computer-readable storage medium (for example, a computer), and is not limited to products in an external form of computer programs. In addition, when the program code is loaded to and executed by a machine, for example, a computer, the computer is the apparatus disclosed in the application. In other implementation, the program code may also be transmitted through some transmission media such as a wire, a cable, and an optical fiber, or in any transmission mode. When the program code is received by, loaded to, and executed by a machine (for example, a computer), the machine is the apparatus disclosed in the application. When a general-purpose image processor actually works, the program code together with the image processor provides a particular apparatus whose operation is similar to that of an application-specific logic circuit.

Although the application has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A face recognition method, comprising:
receiving an input image;
performing face recognition on the input image by using a first convolutional neural network (CNN) model to generate at least one first region of interest (ROI), wherein each first ROI comprises a suspicious image, and a proportion value of a pixel value of the suspicious image in a pixel value of the first ROI is greater than a proportion value of the pixel value of the suspicious image in a pixel value of the input image;
performing face recognition on each first ROI by using a second CNN model to generate at least one second ROI, wherein a quantity of convolution operation layers of the second CNN model is less than a quantity of convolution operation layers of the first CNN model; and
displaying, in the input image, a mark corresponding to a position of the second ROI.

2. The face recognition method according to claim 1, wherein the pixel value of the suspicious image accounts for at least 0.1% of the pixel value of the input image.

3. The face recognition method according to claim 1, wherein the pixel value of the suspicious image accounts for at least 50% of the pixel value of the first ROI.

4. The face recognition method according to claim 1, wherein the first CNN model is established after training is performed by using a plurality of first image materials, the second CNN model is established after training is performed by using a plurality of second image materials, and the plurality of first image materials are different from the plurality of second image materials.

5. The face recognition method according to claim 4, wherein each of the plurality of first image materials comprises a first face image, each of the plurality of second image materials comprises a second face image, the plurality of first image materials has a first pixel value, the plurality of second image materials has a second pixel value, the first face image has a first to-be-detected pixel value, the second face image has a second to-be-detected pixel value, and a first to-be-detected image proportion value of the first to-be-detected pixel value in the first pixel value is different from a second to-be-detected image proportion value of the second to-be-detected pixel value in the second pixel value.

6. The face recognition method according to claim 5, wherein the first to-be-detected image proportion value is less than the second to-be-detected image proportion value.

7. The face recognition method according to claim 6, wherein a proportion value of the first to-be-detected pixel value in the first pixel value is greater than or equal to 0.1%, and a proportion value of the second to-be-detected pixel value in the second pixel value is greater than or equal to 50%.

8. The face recognition method according to claim 7, wherein the plurality of first image materials and the plurality of second image materials are images, of a same face or difference faces, captured in different shadows, at different angles, in different backgrounds, in different light brightness degrees, in different expression changes, or in different shielding degrees.

9. The face recognition method according to claim 1, wherein the input image is a frame of a picture or a film.

10. The face recognition method according to claim 1, wherein the first CNN model comprises a plurality of first convolution operation layers, the second CNN model comprises a plurality of second convolution operation layers, an output of each first convolution operation layer is an input of another subsequent first convolution operation layer, and an output of each second convolution operation layer is an input of another subsequent second convolution operation layer.

11. The face recognition method according to claim 10, wherein an operation parameter quantity of the second convolution operation layer of the second CNN model is 20% of an operation parameter quantity of the first convolution operation layer.

12. The face recognition method according to claim 10, wherein the first convolution operation layer and the second convolution operation layer each comprise a feature extraction layer, and inputs of neurons at the feature extraction layer is connected to a local receptive field at a previous layer to extract a related local feature.

13. The face recognition method according to claim 10, wherein the first convolution operation layer and the second convolution operation layer each comprise a feature mapping layer, the feature mapping layer is obtained by mapping a plurality of features, each mapping is a plane, and weights of neurons at each plane are the same.

14. The face recognition method according to claim 1, wherein the first CNN model further comprises a first pooling operation layer for a pooling operation, and the second CNN model further comprises a second pooling operation layer for a pooling operation.

* * * * *